United States Patent
Kim et al.

(10) Patent No.: US 8,425,363 B2
(45) Date of Patent: Apr. 23, 2013

(54) ROBOT JOINT DRIVING APPARATUS AND ROBOT HAVING THE SAME

(75) Inventors: Kwang Jun Kim, Ansan-si (KR); Young Bo Shim, Seoul (KR); Jeong Hun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 284 days.

(21) Appl. No.: 13/005,060

(22) Filed: Jan. 12, 2011

(65) Prior Publication Data
US 2011/0167946 A1     Jul. 14, 2011

(30) Foreign Application Priority Data
Jan. 12, 2010 (KR) .......................... 10-2010-0002580

(51) Int. Cl.
*F16H 9/26*   (2006.01)

(52) U.S. Cl.
USPC .......................................................... 475/182

(58) Field of Classification Search .................. 475/182, 475/347
See application file for complete search history.

(56) References Cited

U.S. PATENT DOCUMENTS

| | | | | |
|---|---|---|---|---|
| 4,044,633 | A * | 8/1977 | Lee ................................ | 475/182 |
| 4,537,087 | A * | 8/1985 | Faitel .............................. | 475/14 |
| 5,954,611 | A * | 9/1999 | Mills et al. ..................... | 475/182 |

* cited by examiner

*Primary Examiner* — Edwin A Young
(74) *Attorney, Agent, or Firm* — Staas & Halsey LLP

(57) ABSTRACT

A robot joint driving apparatus is smoothly operated without generation of backlash. A robot includes the robot joint driving apparatus. The robot joint driving apparatus includes an internal gear having a ring shape, a main pulley arranged at the center of the internal gear and connected to a power source, first and second pinion gears provided at both sides of the main pulley and engaged with the internal gear, first and second pulleys respectively fastened to the first and second pinion gears, first and second belts respectively connecting the main pulley and the first and second pulleys, and tension adjustment units to adjust tensions of the first and second belts.

16 Claims, 12 Drawing Sheets

ROBOT JOINT DRIVING APPARATUS AND ROBOT HAVING THE SAME

CROSS-REFERENCE TO RELATED APPLICATIONS

This application claims the priority benefit of Korean Patent Application No. 2010-0002580, filed on Jan. 12, 2010 in the Korean Intellectual Property Office, the disclosure of which is incorporated herein by reference.

BACKGROUND

1. Field

Embodiments relate to a robot joint driving apparatus having a gear train which is smoothly operated without generation of backlash, and a robot having the same.

2. Description of the Related Art

Robots of various types for household, military, and industrial purposes, such as a bipedal walking robot and a quadrupedal walking robot, have been developed.

These robots perform various motions as well as walking motions, such as running and walking, through movements of joints.

Joint driving methods include a joint driving method using a motor and a reducer connected to the motor, and a joint driving method using a wire.

In order to carry out the joint driving method using the reducer, a motor and gears are provided. In such a joint driving method, torque of the motor is increased through deceleration by means of a gear train and is transmitted to an output axis.

Here, there is a gap between two gears engaged with each other, and thus a state in which the torque is not transmitted from the gear to the other gear, i.e., backlash, is generated.

SUMMARY

Therefore, it is an aspect of the present embodiments to provide a robot joint driving apparatus which is smoothly operated without generation of backlash, and a robot having the same.

It is another aspect of the present embodiments to provide a robot joint driving apparatus which employs an internal gear so as to be designed in a compact type, and a robot having the same.

It is a further aspect of the present embodiments to provide a robot joint driving apparatus which employs a pair of timing belts so as not to transmit external impact to gear teeth planes, and a robot having the same.

Additional aspects will be set forth in part in the description which follows and, in part, will be obvious from the description, or may be learned by practice of the invention.

In accordance with one aspect, a robot joint driving apparatus includes an internal gear having a ring shape, a main pulley arranged at the center of the internal gear and connected to a power source, first and second pinion gears provided at both sides of the main pulley and engaged with the internal gear, first and second pulleys respectively fastened to the first and second pinion gears, first and second belts respectively connecting the main pulley and the first and second pulleys, and tension adjustment units to adjust tensions of the first and second belts.

The tension adjustment units may include first tension adjustment units provided at a first side of the main pulley to adjust the tensions of the first and second belts.

The tension adjustment units may further include second tension adjustment units provided at a second side of the main pulley in the opposite direction of the first side to adjust the tensions of the first and second belts.

The first tension adjustment units may include a first tension adjustment unit to adjust the tension of the first belt, and a first tension adjustment unit to adjust the tension of the second belt.

The second tension adjustment units may include a second tension adjustment unit to adjust the tension of the first belt, and a second tension adjustment unit to adjust the tension of the second belt.

Each of the tension adjustment units may include a bracket, a bush to apply pressure to at least one of the first and second belts from one side of the bracket, and a screw connection hole formed through the bracket such that a fastening unit is connected to the screw connection hole.

Each of the main pulley, the first and second pulleys, and the first and second belts may be provided with gear teeth.

The first tension adjustment units and the second tension adjustment units may be used alternately so as to interchange contacting teeth planes of the internal gear and the first and second pinion gears.

The internal gear, the main pulley, and the first and second pinion gears may be arranged so as to have the same axis.

In accordance with a further aspect, a robot joint driving apparatus includes an internal gear provided with internal teeth, a main timing pulley arranged at the center of the internal gear and connected to a power source, first and second pinion gears provided at both sides of the main timing pulley and engaged with internal teeth of the internal gear, first and second timing pulleys respectively fastened to the first and second pinion gears, first and second belts respectively connecting the main timing pulley and the first and second timing pulleys, first tension adjustment units provided at one side of the main timing pulley, and applying pressure to the first and second timing belts in a direction toward the center of the internal gear to adjust tensions of the first and second belts, and second tension adjustment units provided at the other side of the main timing pulley, and applying pressure to the first and second timing belts in a direction toward the center of the internal gear to adjust the tensions of the first and second belts.

The first tension adjustment units may include a first tension adjustment unit including a first bracket, a first bush to apply pressure to the first timing belt from one side of the first bracket, and a first screw connection hole formed through the first bracket such that a fastening unit is connected to the first screw connection hole so as to adjust the tension of the first timing belt, and a first tension adjustment unit including a first bracket, a first bush to apply pressure to the second belt from one side of the first bracket, and a first screw connection hole formed through the first bracket such that a fastening unit is connected to the first screw connection hole so as to adjust the tension of the second timing belt.

The second tension adjustment units may include a second tension adjustment unit including a second bracket, a second bush to apply pressure to the first timing belt from one side of the second bracket, and a second screw connection hole formed through the second bracket such that a fastening unit is connected to the second screw connection hole so as to adjust the tension of the first timing belt, and a second tension adjustment unit including a second bracket, a second bush to apply pressure to the second belt from one side of the second bracket, and a second screw connection hole formed through the second bracket such that a fastening unit is connected to the first screw connection hole so as to adjust the tension of the second timing belt.

In accordance with another aspect, a robot includes at least one joint unit, and at least one joint driving apparatus to drive the at least one joint unit, wherein each of the at least one joint driving apparatus includes an internal gear provided in a ring shape, a main pulley arranged at the center of the internal gear and connected to a power source, first and second pinion gears provided at both sides of the main pulley and engaged with the internal gear, first and second pulleys respectively fastened to the first and second pinion gears, first and second belts respectively connecting the main pulley and the first and second pulleys, and tension adjustment units to adjust tensions of the first and second belts.

The tension adjustment units may include first tension adjustment units provided at a first side of the main pulley to adjust the tensions of the first and second belts, and second tension adjustment units provided at a second side of the main pulley putting opposite the first side to adjust the tensions of the first and second belts.

The first tension adjustment units and the second tension adjustment units may be used alternately so as to interchange contacting teeth planes of the internal gear and the first and second pinion gears.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
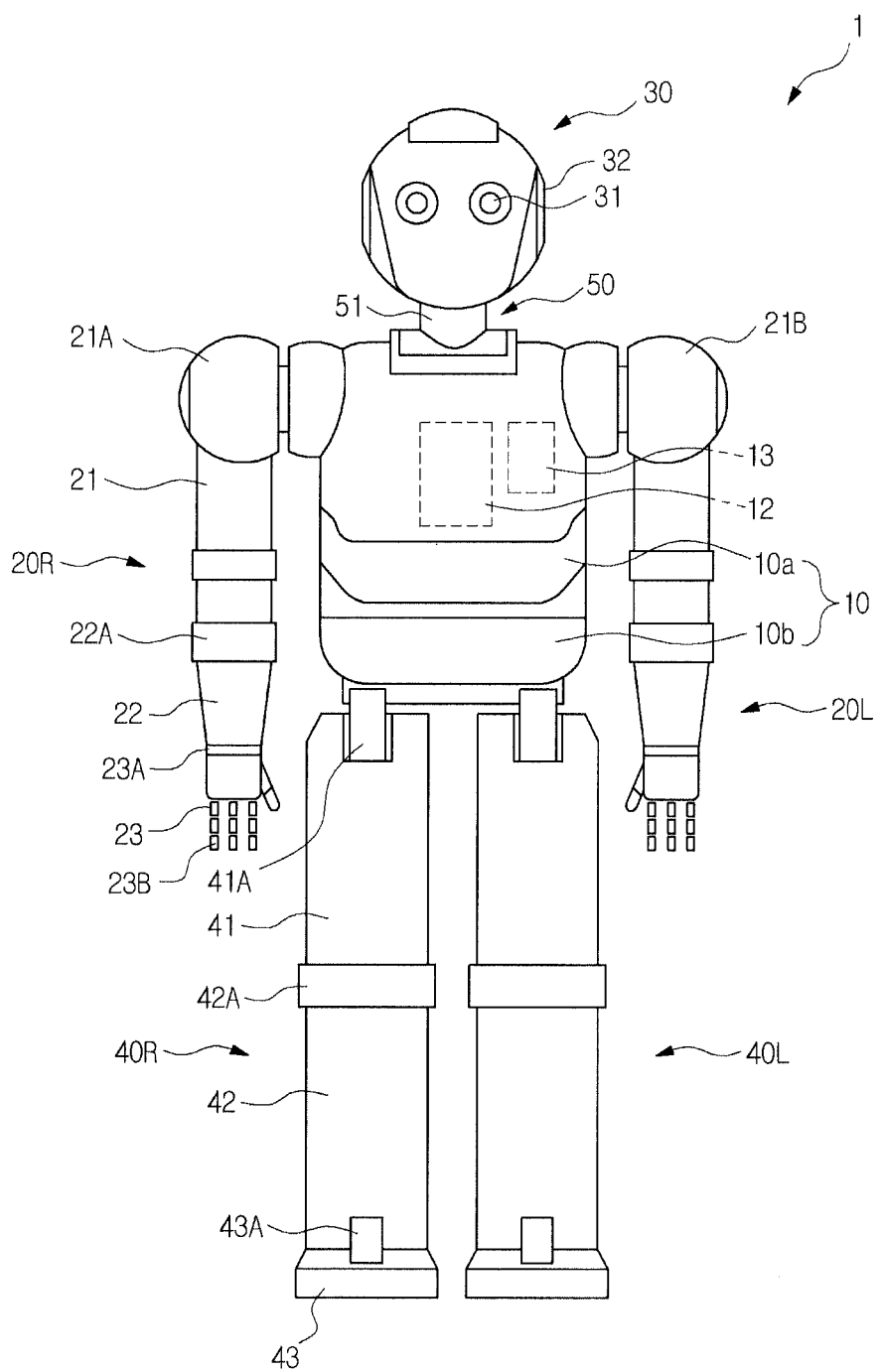
FIG. 1 is a view illustrating an external appearance of a humanoid robot in accordance with one embodiment.

Reference will now be made in detail to the embodiments, examples of which are illustrated in the accompanying drawings, wherein like reference numerals refer to the like elements throughout.

Figure 2:
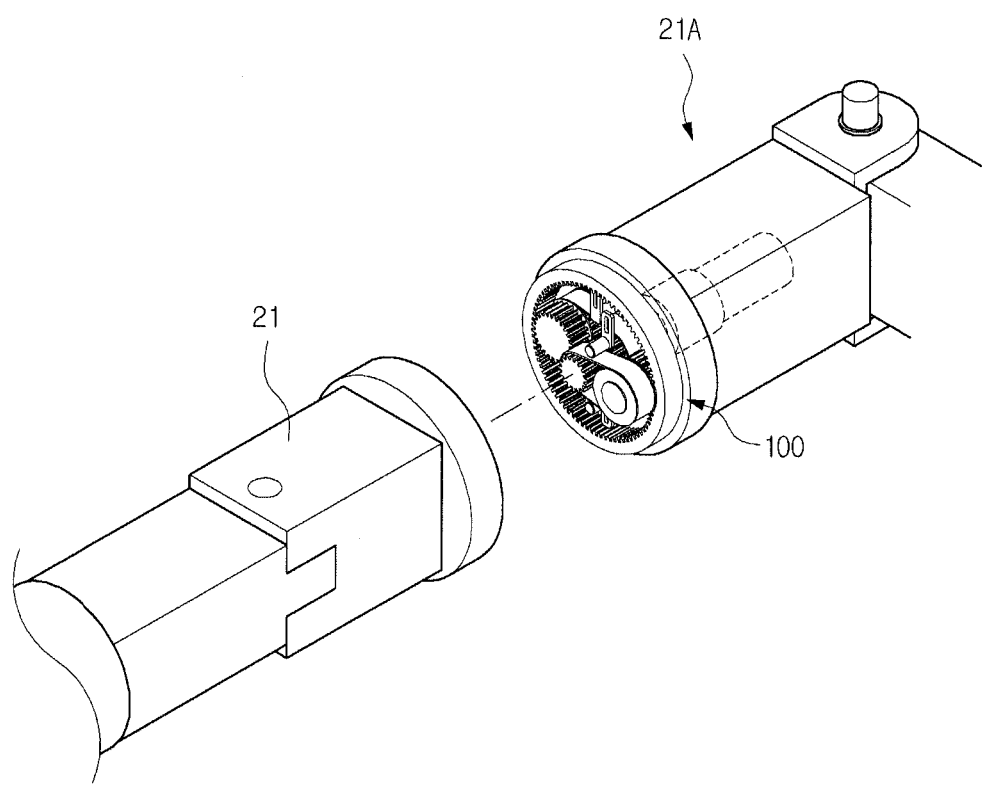
FIG. 2 is an enlarged view of a shoulder joint unit of FIG. 1.

FIG. 1 is a view illustrating an external appearance of a humanoid robot 1 in accordance with one embodiment, and FIG. 2 is an enlarged view of a shoulder joint unit of FIG. 1.

As shown in FIGS. 1 and 2, a humanoid robot 1 in accordance with the embodiment may include a torso 10, arms 20R and 20L connected to both sides of the upper part of the torso 10, a head 30 connected to the upper end of the torso 10, and legs 40R and 40L connected to both sides of the lower part of the torso 10. Both arms 20R and 20L may be connected to the torso 10 through shoulder joint units 21A and 21B, and the head 30 may be connected to the torso 10 through a neck 50. Here, "R" represents the right side of the robot 1, and "L" represents the left side of the robot 1.

The inside of the torso 10 may be protected by a cover 11. A control unit 12 and a battery 13 may be installed in or on the torso 10.

The torso 10 may be divided into a breast unit 10a and a waist unit 10b. The breast unit 10a may be rotated relative to the waist unit 10b.

Each of both arms 20R and 20L may include an upper arm link 21, a lower arm link 22, and a hand 23. The upper arm parts 21 of both arms 20R and 20L may be connected to the torso 10 through the shoulder joint units 21A and 21B. The upper arm links 21 and the lower arm links 22 of both arms 20R and 20L may be connected through elbow joint units 221, and the lower arm links 22 and the hands 23 of both arms 20R and 20L may be connected through wrist joint units 23A.

Fingers 23B may be installed in each hand 23. A plurality of joints (not shown) driven by motors may be installed on each finger 23B. The fingers 23B may perform various motions, such as a motion of gripping an article or a motion of pointing in a designated direction in cooperation with movement or the arm 20.

The shoulder joint units 21A and 21B may be mounted at both sides of the torso 10, and connect both arms 20R and 20L to the torso 10. The two shoulder joint units 21A and 21B may be disposed between the torso 10 and the arms 20R and 20L, and may move the arms 20R and 20L.

Cameras 31, for example, functioning as sense of sight of the robot 1 and microphones 32, for example, functioning as sense of hearing of the robot 1 may be installed on the head 30.

The head 30 may be connected to the torso 10 through a neck joint unit 51. Head rotating motors (not shown) may be connected to the neck joint unit 51. The control unit 12 may control the respective motors to drive the neck joint unit 51 by a proper angle, thereby moving the head 30 in a desired direction.

Each of both legs 40R and 40L may include a thigh link 41, a calf link 42, and a foot 43. The thigh links 41 of both legs 40R and 40L may be connected to the torso 10 through thigh joint units 41A. The thigh links 41 and the calf links 42 of both legs 40R and 40L may be connected through knee joint units 42A, and the calf parts 42 and the feet 43 of both legs 40R and 40L may be connected through ankle joint units 43A.

Joint driving apparatuses to drive the respective joints may be provided on the above robot 1. Although the joint driving apparatus may be applied to various joints of the arms, the legs, and the neck, a joint driving apparatus applied to a shoulder joint unit will be exemplarily described hereinafter.

Figure 3:
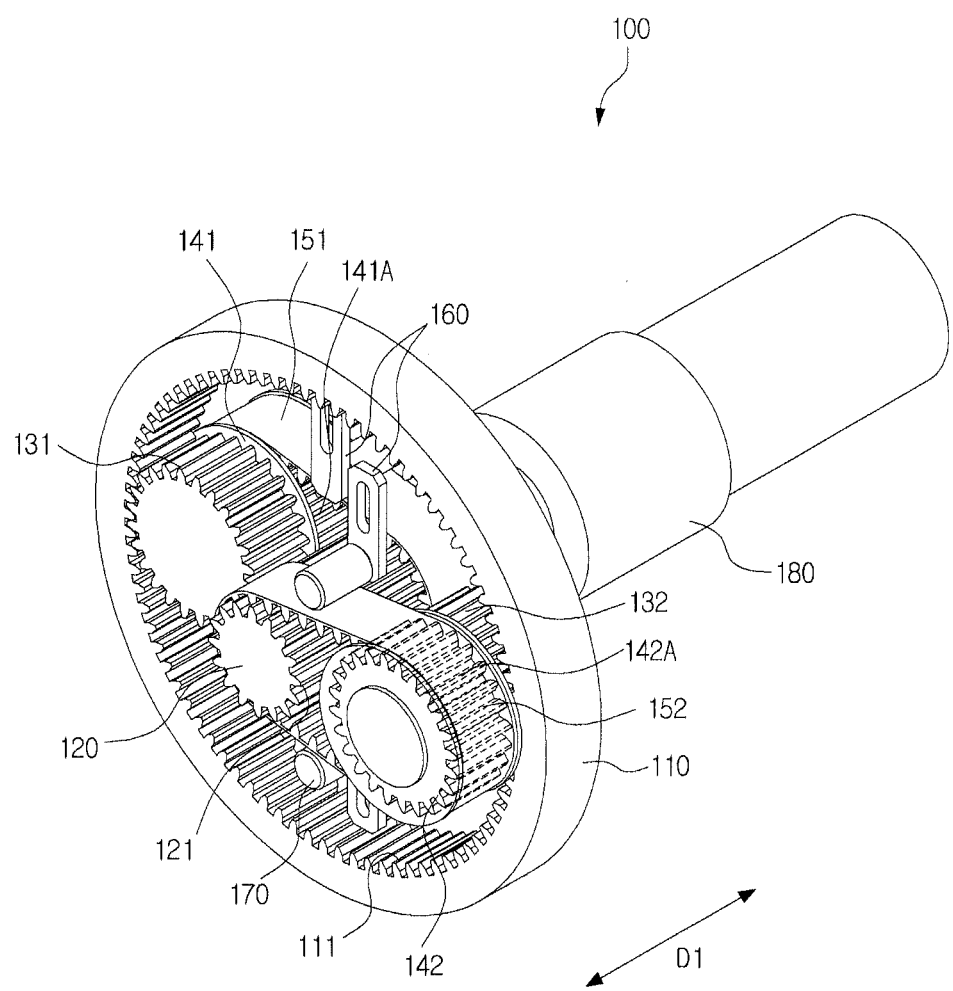
FIG. 3 is a perspective view of a shoulder joint driving apparatus in accordance with the embodiment.
Figure 4:
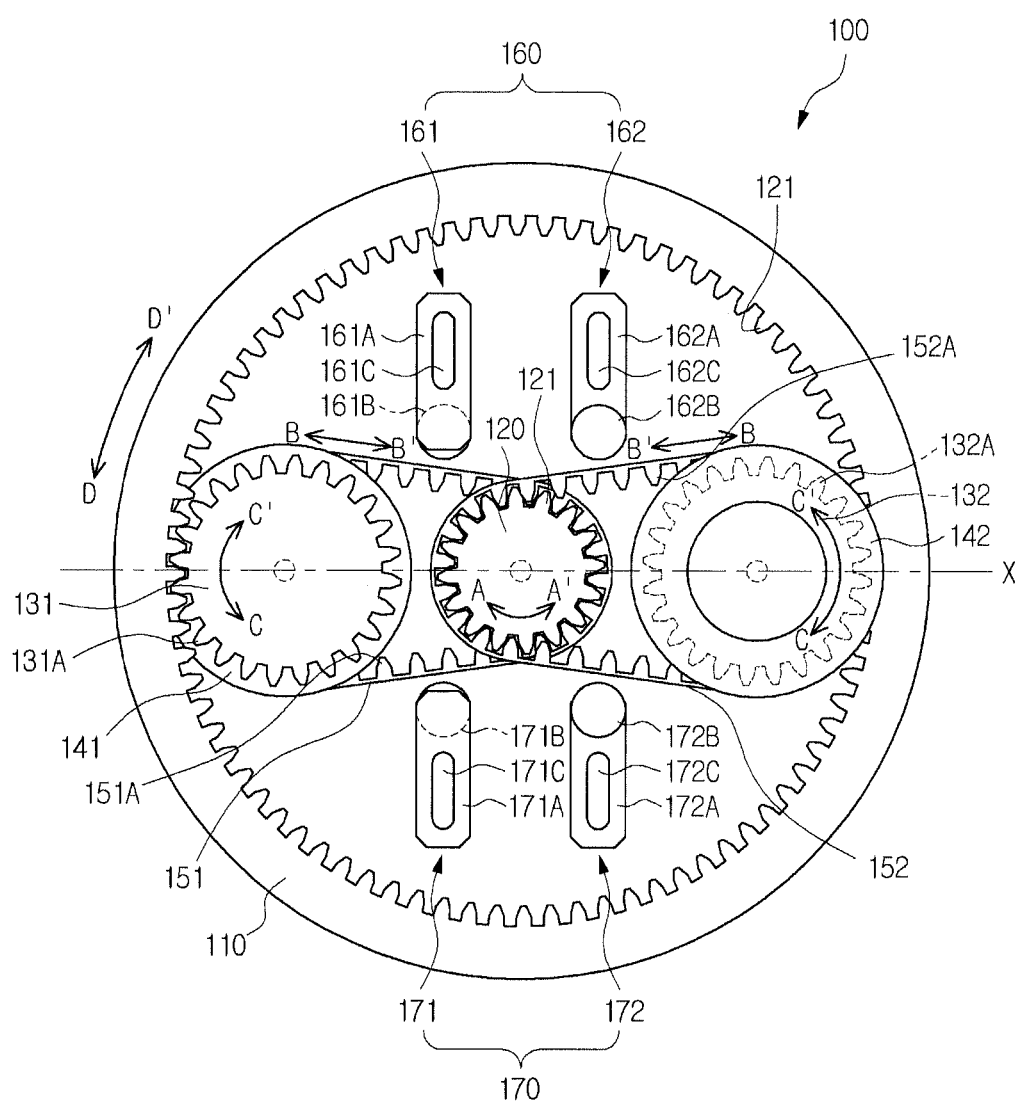
FIG. 4 is a cross-sectional view of the shoulder joint driving apparatus of FIG. 3.

FIG. 3 is a perspective view of a shoulder joint driving apparatus in accordance with the embodiment, and FIG. 4 is a cross-sectional view of the shoulder joint driving apparatus of FIG. 3.

As shown in FIGS. 3 and 4, a shoulder joint driving apparatus 100 in accordance with this embodiment may include an internal gear 110 formed in a ring shape, a main pulley 120 arranged at the center of the internal gear 110 and connected to a power source 180, a pair of pinion gears 131 and 132 engaged with the internal gear 110, a pair of pulleys 141 and 142 respectively fastened to the pair of the pinion gears 131 and 132, a pair of belts 151 and 152 respectively connecting the main pulley 120 and the pair of the pulleys 141 and 142, and tension adjustment units 160 and 170 to adjust tensions of the pair of belts 151 and 152.

The internal gear 110 may be manufactured in a ring shape, for example, having a designated diameter such that internal teeth 111 may be formed on the inner circumferential surface of the internal gear 110, thus forming an external appearance of the joint driving apparatus 100.

The main pulley 120 imay be arranged at the center of the internal gear 110. The main pulley 120 may be connected to the power source 180 and thus power is input to the main pulley 120. The main pulley 120 may include a main timing pulley 120 having gear teeth 121.

The pair of the pinion gears 131 and 132 engaged with the internal teeth 111 of the internal gear 110 may be arranged at both sides of the internal gear 110. Here, the internal gear 110, the main pulley 120, and the pair of the pinion gears 131 and 132 may be arranged to have the same axis X, as shown in FIG. 4.

The pair of the pinion gears 131 and 132 may include a first pinion gear 131 arranged at the left side of the main pulley 120 and engaged with the internal teeth 111 of the internal gear 110, and a second pinion gear 132 arranged at the right side of the main pulley 120 and engaged with the internal teeth 111 of the internal gear 110.

A first pulley 141 and a second pulley 142 may be respectively fastened to the first and second pinion gears 131 and 132. The first pulley 141 and the second pulley 142 may be fastened to the first and second pinion gears 131 and 132 through fastening units 190, such as bolts. The first and second pulleys 141 and 142 may include first and second timing pulleys 141 and 142 respectively having gear teeth 141A and 142A.

The first timing pulley 141 and the second timing pulley 142 and the first pinion gear 131 and the second pinion gear 132 may be arranged at both sides of the main timing pulley 120 diagonally in a forward and backward direction D1. For example, if the first timing pulley 141 is fastened to the rear part of the first pinion gear 131, the second timing pulley 142 is fastened to the front part of the second pinion gear 132.

The first timing pulley 141 may be connected to the main timing pulley 120 through a first belt 151, and the second timing pulley 142 is connected to the main timing pulley 120 through a second belt 152.

The first belt 151 may be connected to the rear part of the main pulley 120 so as to correspond to the first timing pulley 141 fastened to the rear part of the first pinion gear 131, and the second belt 152 may be connected to the front part of the main pulley 120 so as to correspond to the second timing pulley 142 fastened to the front part of the second pinion gear 132. The first belt 151 and the second belt 152 may include first and second timing belts 151 and 152 respectively having gear teeth 151A and 152A.

The first and second timing belts 151 and 152 may be made of an elastic material, for example, rubber or plastic, and the gear teeth 151A and 152A of the first and second timing belts 151 and 152 may be formed corresponding to external teeth 131A and 132A of the first and second pinion gears 131 and 132 and the gear teeth 121 of the main timing pulley 120.

The power source 180 may be connected to the main timing pulley 120 such that power is input to the main timing pulley 120. The power course 180 may include a reducer-integrated motor 180.

The tension adjustment units 160 and 170 may adjust tensions of the first and second timing belts 151 and 152 respectively connecting the main timing pulley 120 and the first and second timing pulleys 141 and 142, thus removing backlash from the first and second pinion gears 131 and 132.

The tension adjustment unit 160 and 170, as shown in FIG. 4, may include first adjustment units 160 provided above the main timing pulley 120 to adjust the tensions of the first and second timing belts 151 and 152, and second adjustment units 170 provided below the main timing pulley 120 to adjust the tensions of the first and second timing belts 151 and 152.

The first tension adjustment units 160 may include a first tension adjustment unit 161 to adjust the tension of the first timing belt 151, and a first tension adjustment unit 162 to adjust the tension of the second timing belt 152.

The first tension adjustment unit 161 may include a first bracket 161A, a first bush 161B to apply pressure to the first timing belt 151 from one side of the first bracket 161A, and a first screw connection hole 161C formed through the first bracket 161A such that a fastening unit 190, such as a screw, is connected to the first screw connection hole 161C.

The first tension adjustment unit 162 may include a first bracket 162A, a first bush 162B to apply pressure to the second timing belt 152 from one side of the first bracket 162A, and a first screw connection hole 162C formed through the first bracket 162A such that the fastening unit 190, such as a screw, is connected to the first screw connection hole 162C.

The second tension adjustment units 170 may include a second tension adjustment unit 171 to adjust the tension of the first timing belt 151, and a second tension adjustment unit 172 to adjust the tension of the second timing belt 152.

The second tension adjustment unit 171 may include a second bracket 171A, a second bush 171B to apply pressure to the first timing belt 151 from one side of the second bracket 171A, and a second screw connection hole 171C formed through the second bracket 171A such that the fastening unit 190, such as a screw, is connected to the second screw connection hole 171C.

The second tension adjustment unit 172 may include a second bracket 172A, a second bush 172B to apply pressure to the second timing belt 152 from one side of the second bracket 172A, and a second screw connection hole 172C formed through the second bracket 172A such that the fastening unit 190, such as a screw, is connected to the second screw connection hole 172C.

In the joint driving apparatus in accordance with the embodiment, one of the pair of the pinion gears 131 and 132 and the internal gear 110 may be fixed such that they move relative to each other.

For example, if the internal gear 110 is connected to a reference frame, not shown, the pair of the pinion gears 131 and 132 may revolve and rotate along the internal teeth 111 of the internal gear 100 through the power input to the main pulley 120. Therefore, it may be a first usable type in which the power is output to the pair of the pinion gears 131 and 132.

Further, if the pair of the pinion gears 131 and 132 is connected to the reference frame, not shown, the pair of the pinion gears 131 and 132 may rotate through the power input to the main pulley 120, and thus the internal gear 110 may be rotated. Therefore, it may be a second usable type in which the power is output to the internal gear 110.

Hereinafter, an operation of the joint driving apparatus 100 in the second usable type in which the pair of the pinion gears 131 and 132 is connected to the reference frame so as to output power to the internal gear 110 will be described.

First, when power output from the reducer-integrated motor 180 is input to the main timing pulley 120, the main timing pulley 120 is rotated in the direction A or A'. The rotation of the main timing pulley 120 in the direction A or A' is transmitted to the first timing pulley 141 and the second timing pulley 142, and thus the first timing pulley 141 and the second timing pulley 142 are rotated in the direction B or B'

Since the first timing pulley 141 is fastened to the first pinion gear 131 and the second timing pulley 142 is fastened to the second pinion gear 132, when the first timing pulley 141 and the second timing pulley 142 are rotated in the direction B of B', the first pinion gear 131 and the second pinion gear 132 are rotated in the same direction, i.e., in the direction C or C'.

Here, the first pinion gear 131 and the second pinion gear 132 are connected to the reference frame, not shown, and thus the internal gear 110 may be rotated in the direction D or D'. Therefore, the internal gear 110 may be rotated at a velocity as much as a gear ratio reduced so as to be lower than a rotational velocity of the main pulley 120, to which power is input.

Now, with reference to the accompanying drawings, an operation of the joint driving apparatus in accordance with the embodiment of the present invention will be described.

Figure 5:
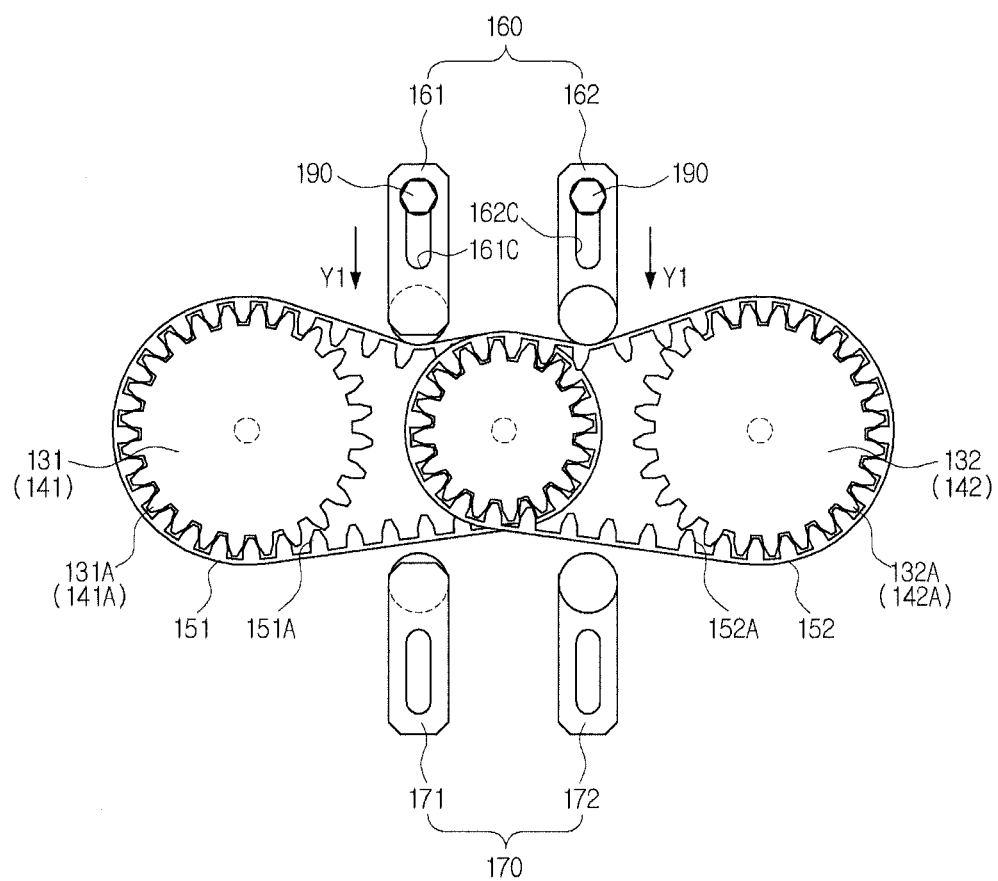
FIG. 5 is a cross-sectional view illustrating a state in which tensions of first and second timing belts are adjusted by first tension adjustment units.
Figure 6:
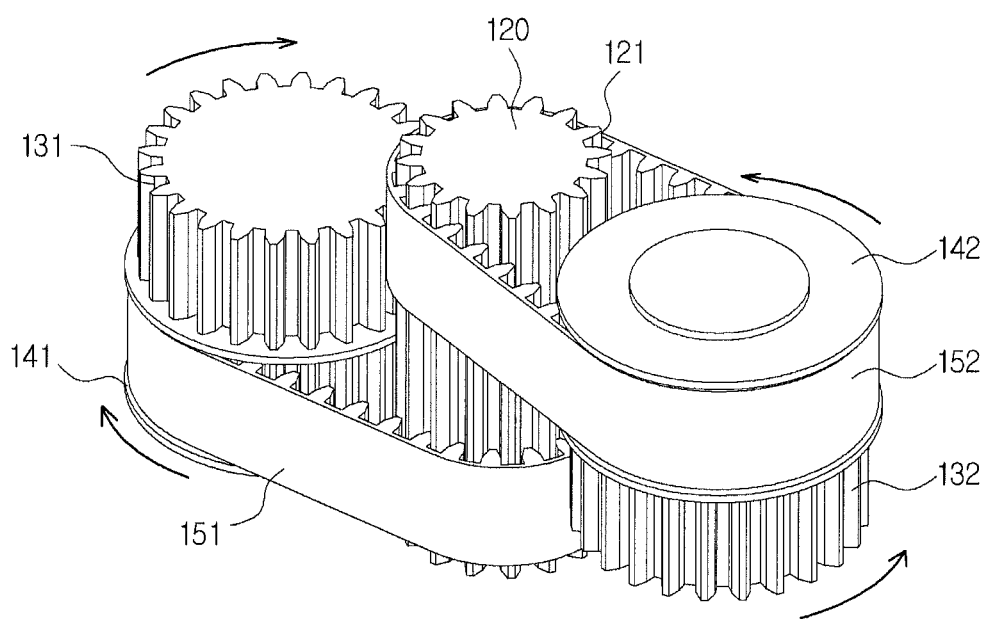
FIG. 6 is a perspective view illustrating rotation of first and second pinion gears, first and second pulleys, and the first and second timing belts in the state shown in FIG. 5.
Figure 7:
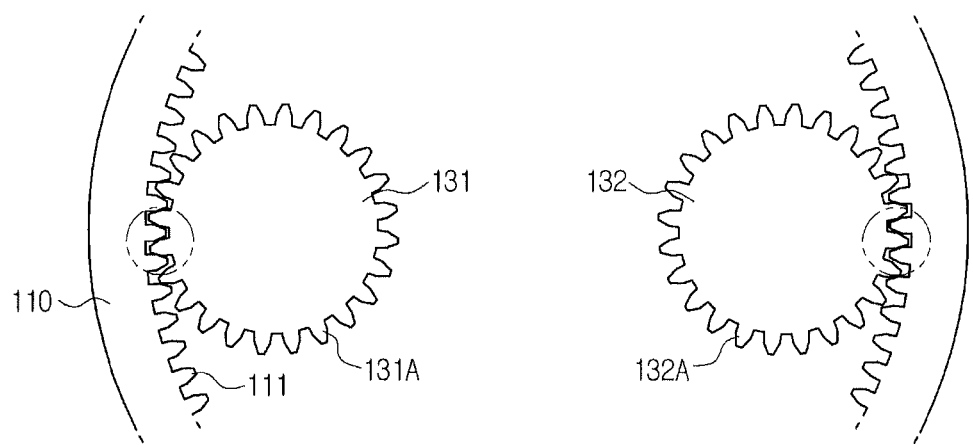
FIG. 7 is a cross-sectional view illustrating decrease of backlash in the first and second pinion gears during the rotation shown in FIG. 6.
Figure 8A:
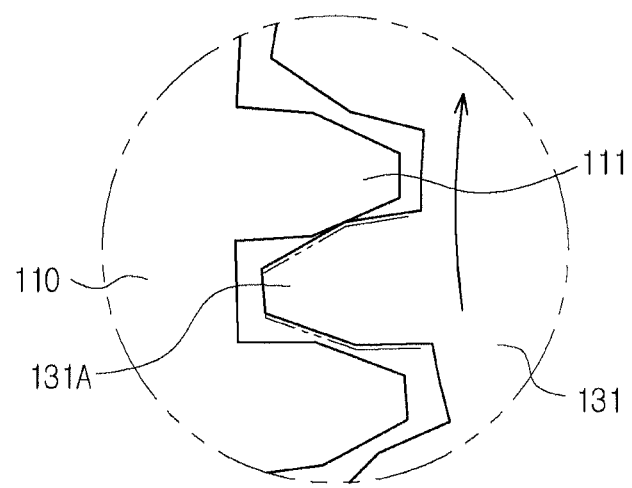
FIGS. 8A and 8B are partially enlarged views of FIG. 7.
Figure 8B:
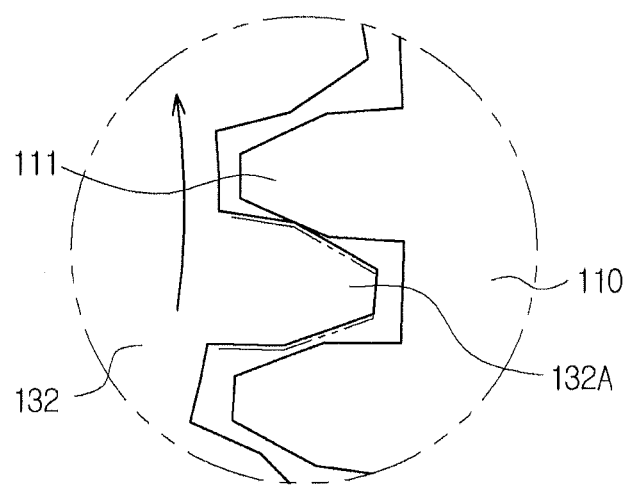

First, with reference to FIGS. 5 to 8, a principle through which backlash is removed by the first tension adjustment units will be described. FIG. 5 is a cross-sectional view illustrating a state in which the tensions of first and second timing belts are adjusted by the first tension adjustment units, FIG. 6 is a perspective view illustrating rotation of the first and second pinion gears, the first and second pulleys, and the first and second timing belts in the state shown in FIG. 5, FIG. 7 is a cross-sectional view illustrating decrease of backlash in the first and second pinion gears during the rotation shown in FIG. 6, and FIGS. 8A and 8B are partially enlarged views of FIG. 7.

As shown in FIG. 5 to FIGS. 8A and 8B, after the main timing pulley 120 is fixed, tensions of the first timing belt 151 and the second timing belt 152 are adjusted. First, as shown in FIG. 5, the first tension adjustment units 161 and 162 move in the direction Y1, i.e., in a direction toward the center of the internal gear 110, thereby increasing the tensions of the first and second timing belts 151 and 152.

When the tensions of the first timing belt 151 and the second timing belt 152 reach a designated level, the first timing belt 151 and the second timing belt 152 respectively rotate the first timing pulley 141 and the second timing pulley 142 in the counterclockwise direction and in the clockwise direction from at a point of time when slippage between the first and second timing belts 151 and 152 and the first and second timing pulleys 141 and 142 is removed.

Further, since the first and second pinion gears 131 and 132 are respectively fastened to the first and second timing pulleys 141 and 142, the first and second pinion gears 131 and 132 are respectively rotated in the counterclockwise direction and in the clockwise direction. As the first and second pinion gears 131 and 132 contact the internal teeth 111 of the fixed internal gear 110, the tensions of the first and second timing belts 151 and 152 are gradually increased. Therefore, when the tensions of the first and second timing belts 151 and 152 are adjusted to a set tension and the fastening units 190 are fixed to the first connection holes 161C and 162C of the first tension adjustment units 161 and 162, the external teeth 131A and 132A of the first and second pinion gears 131 and 132 contact the internal teeth 111 of the internal gear 110, thereby removing backlash.

Next, with reference to FIG. 9 and FIGS. 10A and 10B, a principle through which backlash is removed by the second tension adjustment units will be described.

Figure 9:
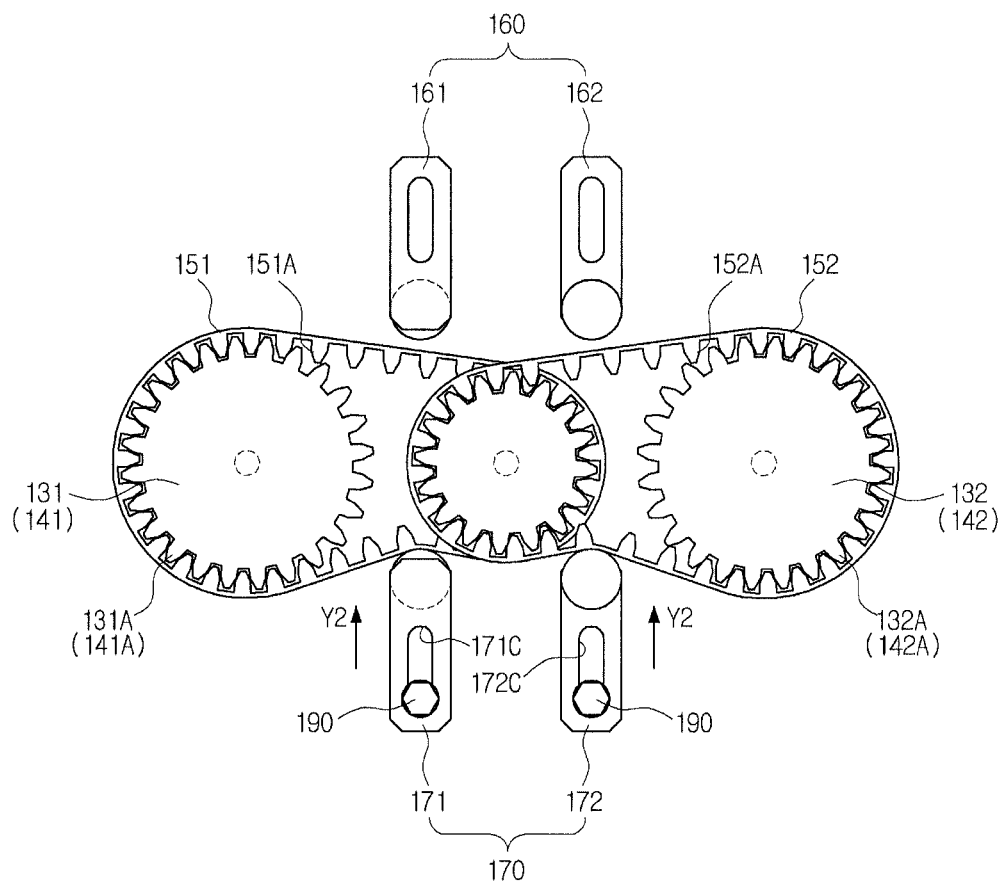
FIG. 9 is a cross-sectional view illustrating a state in which tensions of the first and second timing belts are adjusted by second tension adjustment units.
Figure 10A:
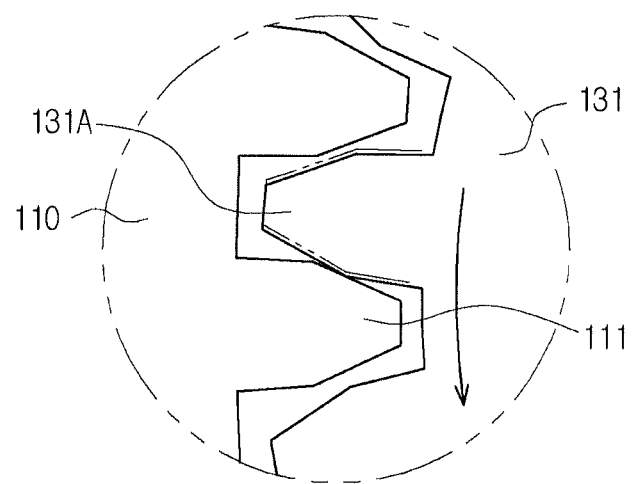
FIGS. 10A and 10B are views illustrating a state in which backlash is removed by the second tension adjustment units.
Figure 10B:
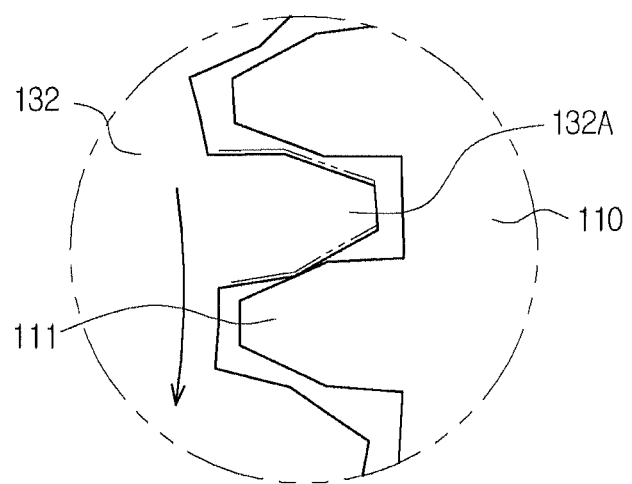

FIG. 9 is a cross-sectional view illustrating a state in which tensions of the first and second timing belts are adjusted by second tension adjustment units, and FIGS. 10A and 10B are views illustrating a state in which backlash is removed by the second tension adjustment units.

As shown in FIG. 9 and FIGS. 10A and 10B, the second tension adjustment units 171 and 172 move in the direction Y2, i.e., in a direction toward the center of the internal gear 110, thereby increasing the tensions of the first and second timing belts 151 and 152. Thereafter, when the tensions of the first and second timing belts 151 and 152 are adjusted to a set tension and the fastening units 190 are fixed to the second connection holes 171C and 172C of the second tension adjustment units 171 and 172, the external teeth 131A and 132A of the first and second pinion gears 131 and 132 contact the internal teeth 111 of the internal gear 110, thereby removing backlash.

The reason why the first tension adjustment units 160 and the second tension adjustment units 170 are arranged above and below the main timing pulley 120 is to interchange contacting teeth planes of the internal gear 110 and the first and second pinion gears 131 and 132.

That is, since damage to the teeth planes of the gear teeth 111, 131A, and 132A of the internal gear 110, the first pinion gear 131, and the second pinion gear 132 other than breakage of the gear teeth 111, 131A, and 132A occurs, if the contacting teeth planes are interchanged, the damage to the teeth planes may be reduced and the internal gear 110, the first pinion gear 131, and the second pinion gear 132 may have the same effects as replacement of the gears 10, the first pinion gear 131, and the second pinion gear 132 with new gears.

Therefore, after a designated lifespan of the joint driving apparatus has elapsed, when the first tension adjustment units 160 and the second tension adjustment units 170 use the opposite contacting teeth planes, the joint driving apparatus may be used for twice the normal lifespan.

The upper arm links 21 (particularly, in a yaw axis) of the humanoid robot 1 require relatively large torque, but have an upper size limit. Thus, by applying the internal gear 110 to the upper arm links 21, the upper arm links 21 may have a design having a similar size of human arms.

Further, a pair of the timing belts 151 and 152 is applied so as not to transmit external impact to gear teeth planes, and a reduction ratio of the timing pulleys 141 and 142 is adjusted so as to reduce a reduction ratio burden in the remaining gears 110, 131, and 132 and thus to cause the joint driving apparatus 1 to have a more compact size.

As is apparent from the above description, in a robot joint driving apparatus and a robot having the same in accordance with one embodiment of the present invention, external teeth of a pair of pinion gears closely contact internal teeth of an internal gear through tension adjustment units, thereby removing backlash.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A robot joint driving apparatus comprising:
an internal gear having a ring shape;
a main pulley arranged at the center of the internal gear and connected to a power source;
first and second pinion gears provided at both sides of the main pulley and engaged with the internal gear;
first and second pulleys respectively fastened to the first and second pinion gears;
first and second belts respectively connecting the main pulley and the first and second pulleys; and tension adjustment units to adjust tensions of the first and second belts.

2. The robot joint driving apparatus according to claim 1, wherein the tension adjustment units include first tension adjustment units provided at a first side of the main pulley to adjust the tensions of the first and second belts.

3. The robot joint driving apparatus according to claim 2, wherein the tension adjustment units further include second tension adjustment units provided at a second side of the main pulley in the opposite direction of the first side to adjust the tensions of the first and second belts.

4. The robot joint driving apparatus according to claim 3, wherein the second tension adjustment units include a second tension adjustment unit to adjust the tension of the first belt, and a second tension adjustment unit to adjust the tension of the second belt.

5. The robot joint driving apparatus according to claim 3, wherein the first tension adjustment units and the second tension adjustment units are used alternately so as to interchange contacting teeth planes of the internal gear and the first and second pinion gears.

6. The robot joint driving apparatus according to claim 2, wherein the first tension adjustment units include a first tension adjustment unit to adjust the tension of the first belt, and a first tension adjustment unit to adjust the tension of the second belt.

7. The robot joint driving apparatus according to claim 1, wherein each of the tension adjustment units includes a bracket, a bush to apply pressure to at least one of the first and second belts from one side of the bracket, and a screw connection hole formed through the bracket such that a fastening unit is connected to the screw connection hole.

8. The robot joint driving apparatus according to claim 1, wherein each of the main pulley, the first and second pulleys, and the first and second belts includes gear teeth.

9. The robot joint driving apparatus according to claim 1, wherein the internal gear, the main pulley, and the first and second pinion gears are arranged so as to have the same axis.

10. A robot joint driving apparatus comprising:
an internal gear having internal teeth;
a main timing pulley arranged at the center of the internal gear and connected to a power source;
first and second pinion gears provided at both sides of the main timing pulley and engaged with internal teeth of the internal gear;
first and second timing pulleys respectively fastened to the first and second pinion gears;
first and second belts respectively connecting the main timing pulley and the first and second timing pulleys;
first tension adjustment units provided at one side of the main timing pulley, and applying pressure to the first and second timing belts in a direction toward the center of the internal gear to adjust tensions of the first and second belts; and
second tension adjustment units provided at the other side of the main timing pulley, and applying pressure to the first and second timing belts in a direction toward the center of the internal gear to adjust the tensions of the first and second belts.

11. The robot joint driving apparatus according to claim 10, wherein the first tension adjustment units includes:
a first tension adjustment unit including a first bracket, a first bush to apply pressure to the first timing belt from one side of the first bracket, and a first screw connection hole formed through the first bracket such that a fastening unit is connected to the first screw connection hole so as to adjust the tension of the first timing belt; and
a first tension adjustment unit including a first bracket, a first bush to apply pressure to the second belt from one side of the first bracket, and a first screw connection hole formed through the first bracket such that a fastening unit is connected to the first screw connection hole so as to adjust the tension of the second timing belt.

12. The robot joint driving apparatus according to claim 10, wherein the second tension adjustment units includes:
a second tension adjustment unit including a second bracket, a second bush to apply pressure to the first timing belt from one side of the second bracket, and a second screw connection hole formed through the second bracket such that a fastening unit is connected to the second screw connection hole so as to adjust the tension of the first timing belt; and
a second tension adjustment unit including a second bracket, a second bush to apply pressure to the second belt from one side of the second bracket, and a second screw connection hole formed through the second bracket such that a fastening unit is connected to the first screw connection hole so as to adjust the tension of the second timing belt.

13. A robot comprising at least one joint unit, and at least one joint driving apparatus to drive the at least one joint unit, each of the at least one joint driving apparatus including:
an internal gear having a ring shape;
a main pulley arranged at the center of the internal gear and connected to a power source;
first and second pinion gears provided at both sides of the main pulley and engaged with the internal gear;
first and second pulleys respectively fastened to the first and second pinion gears;
first and second belts respectively connecting the main pulley and the first and second pulleys; and
tension adjustment units to adjust tensions of the first and second belts.

14. The robot according to claim 13, wherein the tension adjustment units include first tension adjustment units provided at a first side of the main pulley to adjust the tensions of the first and second belts, and second tension adjustment units provided at a second side of the main pulley putting opposite the first side to adjust the tensions of the first and second belts.

15. The robot according to claim 14, wherein the first tension adjustment units and the second tension adjustment units are used alternately so as to interchange contacting teeth planes of the internal gear and the first and second pinion gears.

16. The robot according to claim 13, wherein each of the main pulley, the first and second pulleys, and the first and second belts includes gear teeth.

* * * * *